3,349,032
METHOD OF PREVENTING THE SWELLING OF CLAYS IN SUBTERRANEAN FORMATIONS
Charles D. Krieg, Houston, Tex., assignor to Petrolite Corporation, Wilmington, Del., a corporation of Delaware
No Drawing. Filed Jan. 4, 1965, Ser. No. 423,352
6 Claims. (Cl. 252—8.55)

ABSTRACT OF THE DISCLOSURE

Method for the treatment of clay materials and, more particularly, for preventing, inhibiting, and/or reducing "clay blocking" or plugging of subterranean formations exposed to water, for example, in the recovery of oil from clay-containing subterranean oil-bearing formations by water flooding. The clay-containing or clay materials are contacted with a polyquaternary amine, such as an alkaline either quaternary or an unsaturated quaternary.

---

This invention relates to the treatment of clay materials and more particularly relates to preventing, inhibiting, and/or reducing "clay blocking" or plugging of subterranean formations exposed to water.

When clay-containing subterranean formations are exposed to water, clay swelling causing clay blocking often results so that the formation loses permeability. This is due to the effect of water on the clays in the formation which swells and thus decreases the porosity or permeability of the formation.

For example, drilling mud filtrate can decrease oil permeability which may persist long enough to interfere with drill-stem testing and well completion. Ultimate productivity may suffer when clay damage is severe, especially if drawdown pressures are low, Injection pressures and the time required for water flooding can increase if clay blocking occurs. Thus clay blocking occurs in water sensitive clay formations where drilling, water flooding, fracturing, workovers, well completion, etc. operations are carried out and creates a problem therein. This is particularly true for nonsaline or low saline water.

The technique of water flooding to recover oil from depleted oil fields is well known. In general, such process consists in introducing an aqueous medium into one or more injection wells which penetrate a depleted oil-producing formation, and forcing said medium through the formation towards a production well which likewise penetrates the formation. For example, in the so-called "five-spot drive," the aqueous medium is forced down four injection wells which are more or less symmetrically located around a producing well. As the flooding medium passes through the formation it strips or flushes the residual oil therefrom and carries it into the producing well from which it is recovered by conventional means. The flooding medium usually comprises water to which has been added various conditioning materials, e.g., surface active agents or detergents which promote the desorption of the residual oil from the formation, sequestering agents which prevent the deposition of calcium and/or magnesium compounds in the interstices of the formation, bactericides which prevent the formation from becoming plugged by bacterial growth, corrosion inhibitors which prevent corrosion of the metallic well equipment and the consequent deposition of corrosion products in the formation, etc. Thus, while the process is usually termed "water flooding" the flooding medium in fact constitutes a rather complex composition containing a variety of conditioning agents. It is not uncommon to include as many as 4 or 5 different agents of various types in the flooding medium.

One of the problems encountered in water flooding is that in certain formations clay blocking often results on exposure to the flooding medium so that the formation loses permeability or porosity.

I have now discovered that clay swelling which results in clay blocking can be inhibited, reduced and/or prevented by employing a polyquaternary amine of this invention in the flooding medium.

In carrying out the present process in a clayey formation, the flooding operation is effected in the conventional manner except that the flooding medium contains aqueous solution of these compounds. In a typical five-spot flooding operation, oilfield water containing the compound is introduced into each of the four input wells under a pressure sufficient to force said solution into the formation and drive it therethrough towards the centrally local output well. The operation can be continued over long periods of time without requiring any substantial increase in the pressure required to force the flooding medium through the formation, thus demonstrating that no substantial clay plugging of the formation occurs.

While the flooding media employed in accordance with the present invention essentially comprise only water and one or more of the herein described polyquaternaries, they may also comprise corrosion inhibitors, tracers, supplemental bactericides, and the like. Similarly, they may be employed in conjunction with any of the operating techniques commonly applied to water flooding processes and in conjunction with other secondary recovery methods.

Other modes of applying the principle of this invention may be employed instead of those explained, change being made as regards the methods or materials employed, provided the step or steps stated by any of the following claims, or the equivalent of such stated step or steps, be employed.

In addition the compositions of this invention can also be used in water disposal wells.

This invention provides a simple and economical method for solving the problem of clay blocking encountered in disposing of unwanted water. In many oil fields large volumes of water are produced and must be disposed of when water flooding operations are not in use or where water flooding operations cannot handle the amount of produced water. Most states have laws restricting pollution of streams and/or land with produced waters and oil producers must then find some method of disposing of waste produced salt water. In many instances the water is disposed of by injecting the water into permeable low pressure strata below the fresh water line. The formation into which the water is injected is not usually the oil producing formation and this type of disposal is defined as water disposal or waste water disposal. The problem of clay swelling and plugging of the formation is similar to that encountered in secondary recovery by water flooding.

I have now discovered that clay blocking can be inhibited, reduced and/or prevented by employing a polyquaternary amine in conjunction with such operations. Stated another way the polyquaternaries of this invention reduce clay swelling and clay blocking.

A wide variety of polyquaternary compounds can be employed in this invention. In general I prefer to employ bisquaternaries for example of the general formula

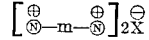

where $m$ is a group linking the two quaternary groups. Thus, $m$ may be any suitable group capable of producing a diquaternary which can prevent clay blocking in accord with this invention.

By way of example $m$ may be alkylene, alkenylene, alkynylene, alkaralkylene, an alkyleneether-containing group, an ester-containing group, and amido-containing group, a group where $m$ joins the nitrogens which are part of a cyclic group, such as in piperazine,

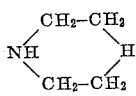, substituted derivatives of the above, etc.

The other groups attached to the quaternary nitrogen $\overset{\oplus}{N}$ may be any suitable group capable of forming a quaternary which can prevent clay blocking in accord with this invention.

In general, these are generally hydrocarbon groups such as alkyl, alkenyl, alkynyl, cycloaliphatic, aralkyl, aryl, alkaralkyl groups, substituted derivatives thereof, such as halogenated, nitro derivatives thereof, etc. The groups may also be part of a cyclic structure such as for example in piperidine, morpholine, pyridine, quinoline, isoquinoline, picoline, etc.

The following are non-limiting examples of bis-quaternary type compositions which can be employed in this invention.

SATURATED QUATERNARIES

These bis-quaternary compounds are in general of the formula $$\left[ \begin{array}{cc} R & R \\ | & | \\ R\overset{\oplus}{N}-A-\overset{\oplus}{N}R \\ | & | \\ R & R \end{array} \right] 2X^{\ominus}$$

where the R's, which may be the same or different, are hydrocarbon groups such as alkyl, alkenyl, aryl, aralkyl, alkaryl, alkarylalkyl, cycloaliphatic, etc.; substituted derivatives thereof such as chloroalkyl, halophenyl, nitrophenyl, etc.; A is an alkylene radical; and X is a negative ion such as those mentioned below.

The preferred embodiment of this type relates to compounds of the formula $$\left[ \begin{array}{cc} CH_3 & CH_3 \\ | & | \\ CH_3-\overset{\oplus}{N}-A-\overset{\oplus}{N}-CH_3 \\ | & | \\ R & R \end{array} \right] 2X^{\ominus}$$

where R is a group such as alkyl, alkenyl, cycloalkyl, aryl, etc.; preferably having at least 6 carbon atoms, such as 8–18, but preferably 12–14, with an optimum of 12 carbon atoms including substituted derivatives thereof, such as chlorophenyl, nitrophenyl, etc.; A is an alkylene radical having, for example, from 2–10 or more carbons, but preferably 2–4 carbons; and X is a negative ion, for example, halogen, such as chlorine, bromine, iodine, or sulfate, sulfonate, etc.

Bis-quaternary compounds are prepared by conventional methods. For example, they are prepared by reacting an alkylene dihalide of the formula X—A—X with a tertiary amine of the formula

where R, A and X have the same meanings as shown in the above formula. This reaction is summarized as follows:

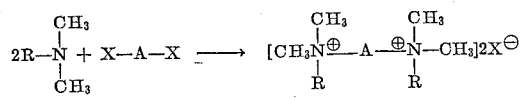

They can also be prepared by reacting a tertiary diamine with 2 moles of a suitable monohalide, for example,

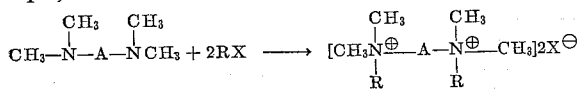

The following examples, among those shown in Table I, illustrate non-limiting methods of preparing these bis-quaternary compounds.

*Example 1*

5.8 grams of tetramethyl ethylene diamine (0.05 mole) and 27.9 ml. of water were stirred in a reaction vessel equipped with a condenser, stirrer and thermometer. To this warm solution was added slowly 22.1 grams of 1-bromodecane (0.1 mole). After completion of addition, the turbid reaction mixture was heated at the reflux temperature (102°) for seven hours until a clear and foamy solution was obtained. Volhard method gave a bromine content of 27.95% calculated on 100% material. (Theoretical value is 29.71%.)

*Example 5*

6.1 grams of 1.6-dibromo-hexane (0.025 mole) in 30 ml. of acetone and 10 ml. of methanol were mixed with 10.7 grams of dimethyl dodecylamine (0.05 mole) in a reactor similar to that in Example 1. The homogeneous solution was heated at reflux for seven hours. White solid was filtered and washed with acetone and dried. 14.2 grams of solid was obtained with a nitrogen content of 4.10% (theoretical value is 4.18%).

Other bisquaternary salts are similarly prepared. To save repetitive detail, a summary of these products is presented in the following Table I.

TABLE I

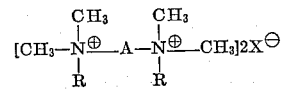

| Ex. | R | A | X |
|---|---|---|---|
| 1 | $C_{10}H_{21}$ | $(CH_2)_2$ | Br (Cl) |
| 2 | $C_{12}H_{25}$ | $(CH_2)_3$ | Br (Cl) |
| 3 | $C_{12}H_{25}$(Coco)[1] | $(CH_2)_4$ | Br (Cl) |
| 4 | $C_{12}H_{25}$ | $(CH_2)_5$ | Br (Cl) |
| 5 | $C_{12}H_{25}$ | $(CH_2)_6$ | Br (Cl) |
| 6 | $C_{14}H_{29}$ | $(CH_2)_6$ | Br (Cl) |
| 7 | $C_{12}H_{25}$ | $(CH_2)_{10}$ | Br (Cl) |
| 8 | $C_{10}H_{21}$ | $(CH_2)_3$ | Br (Cl) |
| 9 | $C_{12}H_{25}$ | $(CH_2)_2$ | Br (Cl) |
| 10 | $C_{14}H_{29}$ | $(CH_2)_2$ | Br (Cl) |
| 11 | $C_{16}H_{33}$ | $(CH_2)_2$ | Br (Cl) |
| 12 | $C_{18}H_{37}$ | $(CH_2)_2$ | Br (Cl) |
| 13 | $C_{12}H_{23}$ (Dodecenyl) | $(CH_2)_2$ | Br (Cl) |
| 14 | $C_{18}H_{35}$ (Octadecenyl) | $(CH_2)_2$ | Br (Cl) |
| 15 | CH₃—⟨ ⟩— | $(CH_2)_2$ | Br (Cl) |
| 16 | ⟨ ⟩— | $(CH_2)_2$ | Br (Cl) |

[1] In dimethylcocoamine the R value is as follows: octyl, 8%; decyl, 9%; dodecyl, 47%; tetradecyl, 18%; hexadecyl, 8%; octadecyl, 5% and octadecenyl, 5%.

Compounds analogous to those in Table I are also prepared from chlorides instead of bromides, as indicated by the notation "(Cl)" under X in the above table.

ARALKYLENE QUATERNARIES

These bis-quaternary compounds are in general of the formula

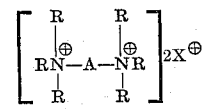

where the R's, which may be the same or different, are hydrocarbon groups such as alkyl, alkenyl, aryl, aralkyl, alkarylalkyl, cycloaliphatic, etc.; substituted derivatives thereof such as haloalkyl, halophenyl, nitrophenyl, etc. A is an aralkylene radical; and X is a negative ion such as those mentioned below.

The preferred embodiment of this type relates to compounds of the formula

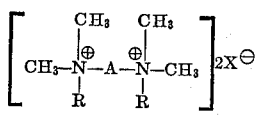 2X⁻ where R is a group such as alkyl, alkenyl, cycloalkyl, aryl, etc. preferably having at least 6 carbon atoms, such as 8–18, but preferably 12–14, with an optimum of 12 carbons atoms including substituted derivatives thereof, such as chlorophenyl, nitrophenyl, etc., and A is an aralkylene radical having for example from 8–30 or more carbons such as 8–20 carbons but preferably where the aralkylene group is xylylene, and X is a negative ion, for example, a halogen, such as chlorine, bromine, iodine, or sulfate, sulfonate, etc. The aralkylene radical can also be substituted for example, with a hydrocarbon, a halogen, a hydroxy etc. group.

Bis-quaternary compounds are prepared by conventional methods. For example, they are prepared by reacting an aralkylene dihalide of the formula X—A—X with a tertiary amine of the formula

where R, A and X have the same meaning as shown in the above formula.

This reaction is summarized as follows:

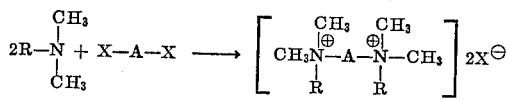

They can also be prepared by reacting a tertiary aralkylene diamine with 2 moles of a suitable monohalide, for example

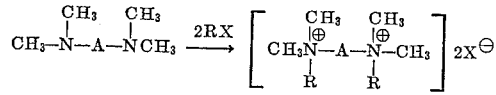

The following example, among those shown in Table II, illustrates non-limiting methods of preparing these bis-quaternary compounds.

Example 3

10.7 grams of dimethyl dodecylamine (0.05 mole), 4.4 grams of p-xylylene dichloride (0.025 mole) in 40 ml. of acetone were stirred in a reaction vessel equipped with a condenser, thermometer and stirrer. The clear solution was heated at reflux for one hour. Solid began to precipitate. Heating was continued for two more hours. Precipitate was filtered and the filtrate concentrated. More precipitate was formed and filtered. Total solid obtained weighed 14 grams. The nitrogen content of the product was found to be 4.52%. Theoretical value is 4.66%.

Other bis-quaternary salts are prepared by similar reactions. To save repetitive details, a summary of these products is presented in the following table.

TABLE II

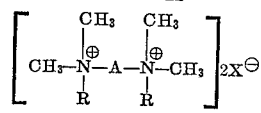 2X⁻

| Ex. | R | A | X |
|---|---|---|---|
| 1 | $C_{10}H_{21}$ | —CH₂—⟨phenylene⟩—CH₂— | Cl |
| 2 | $C_{12}H_{25}$ (Coco)¹ | —CH₂—⟨phenylene⟩—CH₂— | Cl |
| 3 | $C_{12}H_{25}$ | —CH₂—⟨phenylene⟩—CH₂— | Cl |
| 4 | $C_{12}H_{25}$ | —CH₂—⟨naphthylene⟩—CH₂— | Cl |
| 5 | $C_{12}H_{25}$ | —CH₂—⟨phenylene⟩—CH₂— (meta, with two CH₂) | Cl |
| 6 | $C_{12}H_{25}$ | —CH₂—⟨dimethylphenylene⟩—CH₂— | Cl |
| 7 | $C_{12}H_{25}$ | —CH₂—⟨hydroxyphenylene⟩—CH₂— | Cl |
| 8 | $C_{12}H_{25}$ | CH₂—⟨biphenylene⟩—CH₂— | Cl |
| 9 | $C_{14}H_{29}$ | —CH₂—⟨phenylene⟩—CH₂— | Cl |

| Ex. | R | A | X |
|---|---|---|---|
| 10 | $C_{16}H_{33}$ | $-CH_2-\langle\rangle-CH_2-$ | Cl |
| 11 | $C_{18}H_{37}$ | $-CH_2-\langle\rangle-CH_2-$ | Cl |
| 12 | $C_{18}H_{35}$ (Octadecenyl) | $-CH_2-\langle\rangle-CH_2-$ | Cl |
| 13 | $C_{12}H_{23}$ (Dodecenyl) | $-CH_2-\langle\rangle-CH_2-$ | Br |
| 14 | $CH_3-\langle\rangle-$ | $-CH_2-\langle\rangle-CH_2-$ | Cl |

[1] In dimethylcocoamine the R value is as follows: Octyl, 8%; Decyl, 9%; Dodecyl, 47%; Tetradecyl, 18%; Hexadecyl, 8%; Octadecyl, 5%; Octadecenyl, 5%.

Additional examples of aralkylene radicals include those of the formula $-CH_2-Ar-CH_2-$ where Ar is

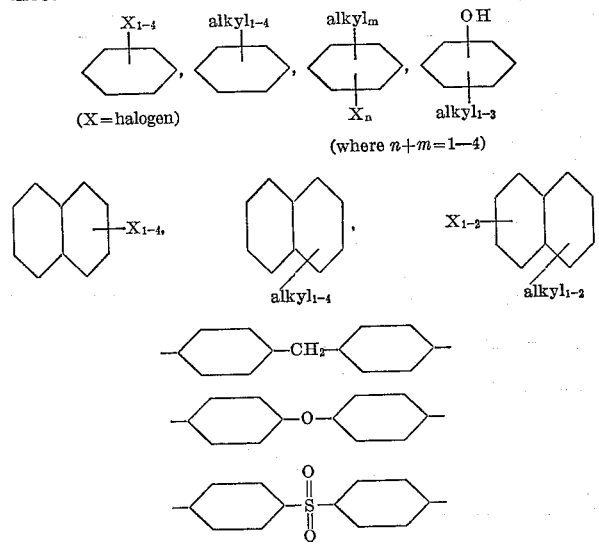

(where $n+m=1-4$)

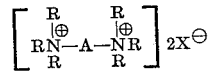

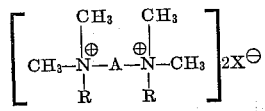

etc. where X=halogen.

ALKYLENE ETHER QUATERNARIES

These bis-quaternary compounds are in general of the formula $$\left[\begin{array}{cc} R & R \\ R\overset{\oplus}{N}-A-\overset{\oplus}{N}R \\ R & R \end{array}\right] 2X^{\ominus}$$

where the R's, which may be the same or different, are hydrocarbon groups such as alkyl, alkenyl, aryl, aralkyl, alkaryl, alkarylalkyl, cycloaliphatic, etc., substituted derivatives thereof such as haloalkyl, halophenyl, nitrophenyl, etc.; A is an alkylene ether radical; and X is a negative ion such as those mentioned below.

The preferred embodiment of this type relates to compounds of the formula $$\left[\begin{array}{cc} CH_3 & CH_3 \\ CH_3-\overset{\oplus}{N}-A-\overset{\oplus}{N}-CH_3 \\ R & R \end{array}\right] 2X^{\ominus}$$

where R is a group such as alkyl, alkenyl, cycloalkyl, aryl, etc., having for example, at least 6 carbon atoms, such as 8–18, but preferably 12–14, with an optimum of 12 carbon atoms, including substituted derivatives thereof such as chlorophenyl, nitrophenyl, etc., and A is an alkylene ether radical including cycloalkylene ether radicals having for example from 1–10 or more carbons such as 1–4 but preferably 2 carbons in each alkylene unit and X is a negative ion, for example, a halogen, such as chlorine, bromine, iodine, or sulfate, sulfonate, etc.

Bis-quaternary compounds are prepared by conventional methods. For example, they are prepared by reacting an alkylene ether dihalide of the formula X–A–X with a tertiary amine of the formula $$\begin{array}{c} CH_3 \\ | \\ NCH_3 \\ | \\ R \end{array}$$

where R, A and X have the same meaning as shown in formula above. This reaction is summarized as follows:

They can also be prepared by reacting an alkylene ether tertiary diamine with 2 moles of a suitable monohalide, for example,

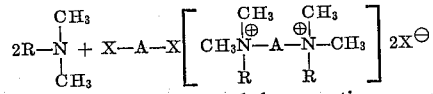

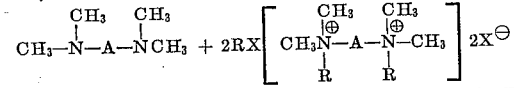

The following examples, among those shown in Table III, illustrate non-limiting methods of preparing these bisquaternary compounds.

Example 2

23.4 g. of dimethyl cocoamine (0.1 mole) was mixed and stirred with 30.6 g. of water in a reaction vessel equipped with a condenser, stirrer and thermometer. One observed an endothermic effect. To this milky mixture was added slowly 7.2 g. of B-B'-dichloroethyl ether (0.05 mole) with subsequent heating. The milky reaction mixture was heated at reflux (about 102° C.) for about one hour and then let stand overnight. The reaction mixture was heated for another ten hours. At the end of this time, the 50% solution was completely clear and foamy. Percent of titratable chlorine determined by Volhard method was 11.00 as compared to the theoretical value of 11.62 (calculated on 100% active basis).

Example 3

21.3 g. of dimethyl dodecyl amine (0.1 mole) and 2.9 g. of Cellosolve were stirred in a reaction vessel similar to that employed in Example 2 and heated to 150° C. To this reaction mixture was added slowly 7.2 g. of B-B'-dichloroethyl ether (0.5 mole). The reaction mixture was subsequently heated at 150° for 45 minutes, and the product was diluted with isopropanol and water to 50% active.

Other bisquaternary salts are similarly prepared. To save repetitive details, a summary of these products is presented in the following table.

TABLE III

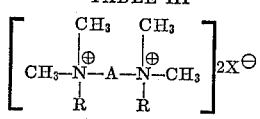

| Ex. | R | A | X |
|---|---|---|---|
| 1 | C₁₀H₂₁ | —CH₂CH₂—O—CH₂CH₂— | Cl |
| 2 | C₁₂H₂₅ (coco)¹ | —CH₂CH₂—O—CH₂CH₂— | Cl |
| 3 | C₁₂H₂₅ | —CH₂CH₂—O—CH₂CH₂— | Cl |
| 4 | C₁₄H₂₉ | —CH₂CH₂—O—CH₂CH₂— | Cl |
| 5 | C₁₆H₃₃ | —CH₂CH₂—O—CH₂CH₂— | Cl |
| 6 | C₁₈H₃₇ | —CH₂CH₂—O—CH₂CH₂— | Cl |
| 7 | C₁₂H₂₅ (coco)¹ | —CH₂CH₂(CH₂CH₂O)₂— | Cl |
| 8 | C₁₂H₂₅ | —CH₂CH₂(CH₂CH₂O)₂— | Cl |
| 9 | C₁₄H₂₉ | —CH₂CH₂(CH₂CH₂O)₂— | Cl |
| 10 | C₁₆H₃₃ | —CH₂CH₂(CH₂CH₂O)₂— | Cl |
| 11 | C₁₈H₃₇ | —CH₂CH₂(CH₂CH₂O)₂— | Cl |
| 12 | C₁₈H₃₅ (Octadecenyl) | —CH₂CH₂(CH₂CH₂O)₂— | Cl |
| 13 | C₁₂H₂₃ (Dodecenyl) | —CH₂CH₂—O—CH₂CH₂— | Cl |
| 14 | C₁₂H₂₅ |  | Cl |
| 15 | C₁₂H₂₅ | —CH₂CH₂—O—CH₂—O—CH₂CH₂— | Cl |
| 16 | (phenyl) | —CH₂CH₂—O—CH₂—O—CH₂CH₂— | Cl |
| 17 | CH₂—(phenyl)—CH₂— | —CH₂CH₂—O—CH₂—O—CH₂CH₂— | Cl |

¹ In dimethyl cocoamine the R value is as follows: Octyl, 8%; Decyl, 9%; Dodecyl, 47%; Tetradecyl, 18%; Hexadecyl, 8%; Octadecyl, 5%; Octadecenyl, 5%.

Additional examples of A include groups of the formula $(BO)_n$ where bis$(CH_2)_{1-10}$, $$-\overset{Y}{\underset{|}{C}H}-CH_2$$

where Y is alkyl, for example

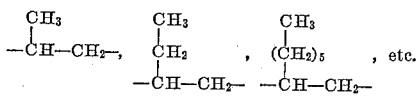

etc.

Thus, B can be methylene, polymethylene, ethylene, propylene, butylene, octylene, etc. In addition, $(BO)_n$ may be homo or hetero as to B, to yield for example $(ETO)_a(PrO)_b$, $(PrO)_a(BuO)_b$, or $(PrO\text{-}ETO)_n$;

—CH₂OCH₂CH₂OCH₂CH₂OCH₂— etc.

These compounds also include the formal of ethylene chlorohydrin and bromohydrin, for example, the bisquaternaries prepared from ClCH₂CH₂OCH₂OCH₂CH₂Cl, ClCH₂CH₂OCH₂CH₂OCH₂OCH₂CH₂OCH₂CH₂Cl etc.

These halocompounds can be reacted with the proper tertiary amine to yield the bisquaternaries of this invention.

UNSATURATED QUATERNARIES

These bisquaternary compounds are in general of the formula

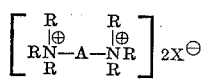

where the R's, which may be the same or different, are hydrocarbon groups such as alkyl, alkenyl, aryl, aralkyl, alkaryl, alkarylalkyl, cycloaliphatic, etc.; substituted derivatives thereof such as haloalkyl, halophenyl, nitrophenyl, etc.; A is an unsaturated aliphatic radical; and X is a negative ion such as those mentioned below.

The preferred embodiment of this type relates to compounds of the formula

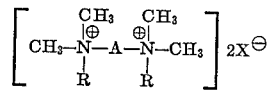

where R is a group such as alkyl, alkenyl, cycloalkyl, aryl, etc., preferably having at least 6 carbon atoms, such as 8–18, but preferably 12–14, with an optimum of 12 carbon atoms, including substituted derivatives thereof such as chlorophenyl, nitrophenyl, etc., and A is an unsaturated aliphatic hydrocarbon radical having, for example, from 2–10 or more carbons but preferably 4 carbons, for example, alkenylene and alkinylene radicals and X is a negative ion, for example, a halogen, such as chlorine, bromine, iodine, or sulfate, sulfonate, etc.

Bisquaternary compounds are prepared by conventional methods. For example, they are prepared by reacting an unsaturated dihalide of the formula X—A—X with a tertiary amine of the formula

where R, A and X have the same meaning as shown in the above formula. This reaction is summarized as follows:

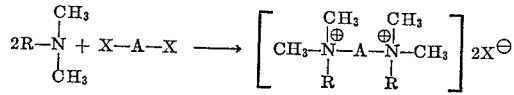

They can also be prepared by reacting a tertiary unsaturated diamine with two moles of a suitable monohalide, for example,

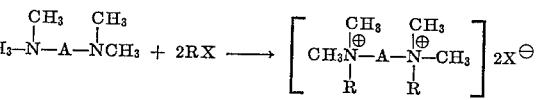

The following example, among those shown in Table IV, illustrates non-limiting methods of preparing these bisquaternary compounds.

Example 2

23.4 g. of dimethylcocoamine (0.1 mole) was stirred with 29.7 g. of water in a reaction vessel equipped with a condenser, a thermometer and stirrer. 6.3 g. of 1,4-dichlorobutene-2 (0.05 mole) was added slowly to the reaction mixture. One observed a gradual rise of temperature. In order to hasten the reaction, heat was applied. The turbid reaction mixture became clear at about 80° C. The reaction mixture was heated to 102° C. The total time of heating lasted about 20 minutes. Percent of chlorine determined by Volhard method was 11.88 as compared to the theoretical value of 11.97 (calculated on 100% active basis).

In dimethylcocoamine the R value is as follows:

| | Percent |
|---|---|
| Octyl | 8 |
| Decyl | 9 |
| Dodecyl | 47 |
| Tetradecyl | 18 |
| Hexadecyl | 8 |
| Octadecyl | 5 |
| Octadecenyl | 5 |

Other bisquaternary salts are similarly prepared. To save repetitive details, a summary of these products is presented in the following table.

TABLE IV $$\left[ \begin{array}{c} CH_3 \quad CH_3 \\ |\oplus \quad |\oplus \\ CH_3-N-A-N-CH_3 \\ | \quad | \\ R \quad R \end{array} \right] 2X^{\ominus}$$

| Ex. | R | A | X |
|---|---|---|---|
| 1 | $C_{10}H_{21}$ | $-CH_2-CH=CH-CH_2-$ | Cl |
| 2 | $C_{12}H_{25}$ (Coco) | $-CH_2-CH=CH-CH_2-$ | Cl |
| 3 | $C_{12}H_{25}$ | $-CH_2-CH=CH-CH_2-$ | Cl |
| 4 | $C_{14}H_{29}$ | $-CH_2-CH=CH-CH_2-$ | Cl |
| 5 | $C_{16}H_{33}$ | $-CH_2-CH=CH-CH_2-$ | Cl |
| 6 | $C_{18}H_{37}$ | $-CH_2-CH=CH-CH_2-$ | Cl |
| 7 | $C_{12}H_{25}$ | $-CH_2-C\equiv C-CH_2-$ | Cl |
| 8 | $C_{14}H_{29}$ | $-CH_2-C\equiv C-CH_2-$ | Cl |
| 9 | $C_{18}H_{37}$ | $-CH_2-C\equiv C-CH_2-$ | Cl |
| 10 | $C_{12}H_{25}$ | $-CH_2-C\equiv C-CH_2-$ | Cl |
| 11 | $C_{12}H_{23}$ (Dodecenyl) | $-CH_2-CH=CH-CH_2-$ | Br |
| 12 | 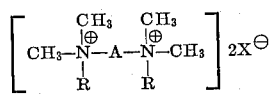 | $-CH_2-CH=CH-CH_2-$ | Cl |
| 13 | $CH_3-$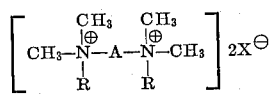 | $-CH_2-CH=CH-CH_2-$ | Cl |

In order to demonstrate the effectiveness of bisquaternaries compounds in accordance with this invention in preventing the swelling of clay, tests are made on clay-containing synthetic cores.

The cores are made by subjecting a mixture of Lucite powder, sand and clay to elevated temperature and pressure. For the purposes of these tests, mixtures containing about 83% sand, 15% Lucite molding powder and 2% clay are found to be satisfactory. In preparing the cores the mixture is stirred until a homogeneous mass is obtained. Next, a Lucite tube 1⅜" in length having a 1½" O.D. and 1⅜" I.D. is placed in a 1½" metallurgical mounting cylinder and filled with the clay-sand-Lucite powder mixture. The mold is heated to 120° C., and maintained at a pressure of 2,000–4,000 p.s.i., for about 15 minutes. After cooling, the mounted core is removed from the apparatus and the two faces are ground flat on a machine lathe. This produces a core mounted in the same manner as cores commonly used in relative permeability determinations.

The procedure for determining permeability is as follows: The air permeability is determined. The core is then evacuated and saturated with the particular solution which is to be used in the experiment. The cores are then weighed and the porosity is determined. The permeability of the cores to different fluids is then determined. Each solution tested contained 100 p.p.m. of formaldehyde to minimize bacterial problems.

The following examples will demonstrate the effectiveness of diquaternaries in preventing swelling of clays. A core prepared as just described is determined to have a permeability of a certain number of millidarcies to one molar sodium chloride solution. After this determination, distilled water is passed through the core whereupon the permeability decreased to resulting in lower millidarcies. This behavior is typical of cores which contain swelling-type clays.

A second core is determined to have a permeability of a certain number of millidarcies to one molar sodium chloride solution. Following this determination an aqueous solution of a diquaternary is passed through the core in accordance with this invention. After this treatment is permeability of the core to distilled water is found to have approximately the same or an increase in millidarcies thus demonstrating that swelling of the clay had been prevented.

In order to further demonstrate the efficiency of diquaternaries of the type herein disclosed in preventing swelling of clay-containing formations, a number of core tests similar to those just described are made. Compounds are selected for testing which are effective in preventing swelling of clay formations.

The compounds described in Tables I, II, III, and IV are tested and found to be effective in preventing clay swelling.

One compound, Example 2, Table III

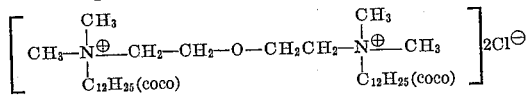

is found to be particularly effective when tested in actual water flood operations.

The description contained herein has shown that polyquaternaries are effective in reducing clay swelling. I have particularly shown that polyquaternaries are particularly effective in preventing the swelling of clay-containing materials in subterranean formation, such as in the petroleum industry. I have described in detail the use of polyquaternaries in water flooding operations. However, it should be understood that the invention is also applicable in other applications where clay swelling is a problem such as in fracturing, workovers, well completion and the like.

The amount of polyquaternary compounds employed herein can vary widely depending for example on the particular polyquatenary, the particular formation, the particular operation, etc. In practice I have employed at least about 5 p.p.m. based on water, such as about 10 to 10,000 p.p.m. or more such as from about 20 to 5,000 p.p.m. for example from about 50–500 p.p.m. but preferably about 100–300 p.p.m.

Larger amounts can be employed, if desired, such as about as high as 5% or greater but in general there is no economic advantage in so doing. In general, one determines the most effective amount based on cost and employs that amount.

As is quite evident, new polyquaternaries will be constantly developed which could be useful in this invention. It is, therefore, not only impossible to attempt a comprehensive catalogue of such compositions, but to attempt to describe the invention in its broader aspects in terms of specific polyquaternaries used would be too voluminous and unnecessary since one skilled in the art could by following the description of the invention herein select a useful polyquaternary. This invention lies in the use of suitable polyquaternaries and their individual compositions are important only in the sense that their properties can affect this function. To precisely define each specific useful polyquaternary in light of the present disclosure would merely call for knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability or specific polyquaternaries suitable for this invention by applying them in the processes set forth therein. In analogy to the case of a machine, wherein the use of certain materials of construction or dimensions of parts would lead to no practical useful result, various polyquaternaries will be rejected as less effective where others would be more effective. One can obviously assume that no one will wish to use a useless polyquaternary nor will be misled because it is possible to misapply the teachings of the present disclosure to do so. Thus, any polyquaternary that can perform the function stated herein can be employed.

Having thus described my invention what I claim as new and desire to obtain by Letters Patent is:

1. A method of preventing the swelling of clay-containing materials in contact with water which is characterized by contacting said materials with a polyquaternary amine selected from the group consisting of
   (1) the polyquaternary amine having the formula

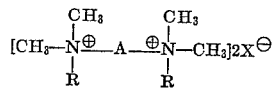

where R is selected from the group consisting of a hydrocarbon radical having at least 6 carbon atoms, chlorophenyl, and nitrophenyl,
   A is selected from the group consisting of an alkylene ether radical having 1–10 carbon atoms and a cycloalkylene ether radical having 4–10 carbon atoms, and
   X is an anion, and
   (2) the polyquaternary amine having the formula

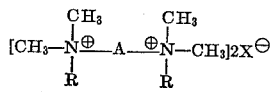

where R is selected from the group consisting of a hydrocarbon radical having at least 6 carbon atoms, chlorophenyl, and nitrophenyl,
   A is an unsaturated aliphatic hydrocarbon radical having 2–10 carbon atoms, and
   X is an anion.

2. The method of claim 1 wherein the polyquaternary amine is

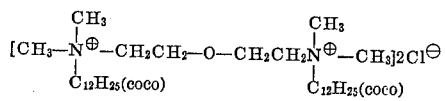

3. A method of preventing the swelling of clay-containing materials in subterranean formations in contact with water which is characterized by contacting said material with a polyquaternary amine selected from the group consisting of
   (1) the polyquarternary amine having the formula

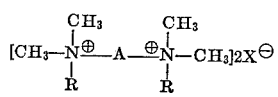

where R is selected from the group consisting of a hydrocarbon radical having at least 6 carbon atoms, chlorophenyl, and nitrophenyl,
   A is selected from the group consisting of an alkylene ether radical having 1–10 carbon atoms and a cycloalkylene ether radical having 4–10 carbon atoms, and
   X is an anion, and
   (2) the polyquaternary amine having the formula

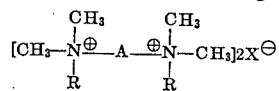

where R is selected from the group consisting of a hydrocarbon radical having at least 6 carbon atoms, chlorophenyl, and nitrophenyl,
   A is an unsaturated aliphatic hydrocarbon radical having 2–10 carbon atoms, and
   X is an anion.

4. The method of claim 3 wherein the polyquaternary amine is

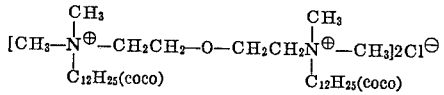

5. A method of recovering oil from clay-containing subterranean oil-bearing formations by water flooding which is characterized by flooding said formations with water containing a polyquaternary amine selected from the group consisting of
   (1) the polyquaternary amine having the formula

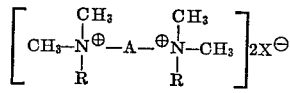

where R is selected from the group consisting of a hydrocarbon radical having at least 6 carbon atoms, chlorophenyl, and nitrophenyl,
   A is selected from the group consisting of an alkylene ether radical having 1–10 carbon atoms and a cycloalkylene ether radical having 4–10 carbon atoms, and
   X is an anion, and
   (2) the polyquaternary amine having the formula

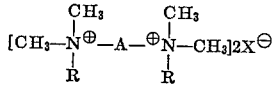

where R is selected from the group consisting of a hydrocarbon radical having at least 6 carbon atoms, chlorophenyl, and nitrophenyl,
   A is an unsaturated aliphatic hydrocarbon radical having 2–10 carbon atoms, and
   X is an anion
in an amount sufficient to prevent the swelling of the clays in said formations 6. The method of claim 5 wherein the polyquaternary amine is

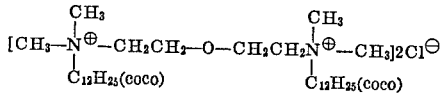

References Cited

UNITED STATES PATENTS

| | | | |
|---|---|---|---|
| 2,761,838 | 9/1956 | Brown et al. | 252—8.55 |
| 2,761,843 | 9/1956 | Brown et al. | 252—8.55 |
| 3,017,351 | 1/1962 | Scott et al. | 252—8.5 |
| 3,034,983 | 5/1962 | Reddie et al. | 252—8.5 |

LEON D. ROSDOL, *Primary Examiner.*

HERBERT B. GUYNN, *Examiner.*